United States Patent [19]
Anderson

[11] 3,889,883
[45] June 17, 1975

[54] LIVE BOTTOM CHUTE FOR SPREADERS
[75] Inventor: Robert D. Anderson, Murdock, Minn.
[73] Assignee: TCI, Inc., Benson, Minn.
[22] Filed: Jan. 7, 1974
[21] Appl. No.: 431,390

[52] U.S. Cl. .................................. 239/679; 198/77
[51] Int. Cl. ............................................ A01c 17/00
[58] Field of Search ........... 239/650, 668, 672, 676, 239/677, 679, 681, 682, 684, 687; 198/6, 89, 97, 101; 214/17 C, 17 CB

[56] References Cited
UNITED STATES PATENTS

| | | | |
|---|---|---|---|
| 1,570,484 | 1/1926 | Hanson | 198/89 |
| 2,309,715 | 2/1943 | Rudow | 198/89 |
| 3,085,807 | 4/1963 | Tyler | 239/665 |
| 3,174,758 | 3/1965 | Conibear | 239/676 |
| 3,313,549 | 4/1967 | Bell | 239/682 |
| 3,539,113 | 11/1970 | Tyler | 239/676 |

Primary Examiner—Evon C. Blunk
Assistant Examiner—Robert Saifer
Attorney, Agent, or Firm—Dugger, Johnson & Westman

[57] ABSTRACT

A live belt, adjustable feed chute for spreaders, for example inorganic fertilizer and lime spreaders which have rotating spinners for distributing material from a storage hopper, comprising an adjustable conveyor belt section positioned to receive material from the hopper and to deposit it onto the spinners. The adjustable section is movable to permit the material being spread to be deposited in different locations in relation to the axis of spin of the spinners.

14 Claims, 7 Drawing Figures

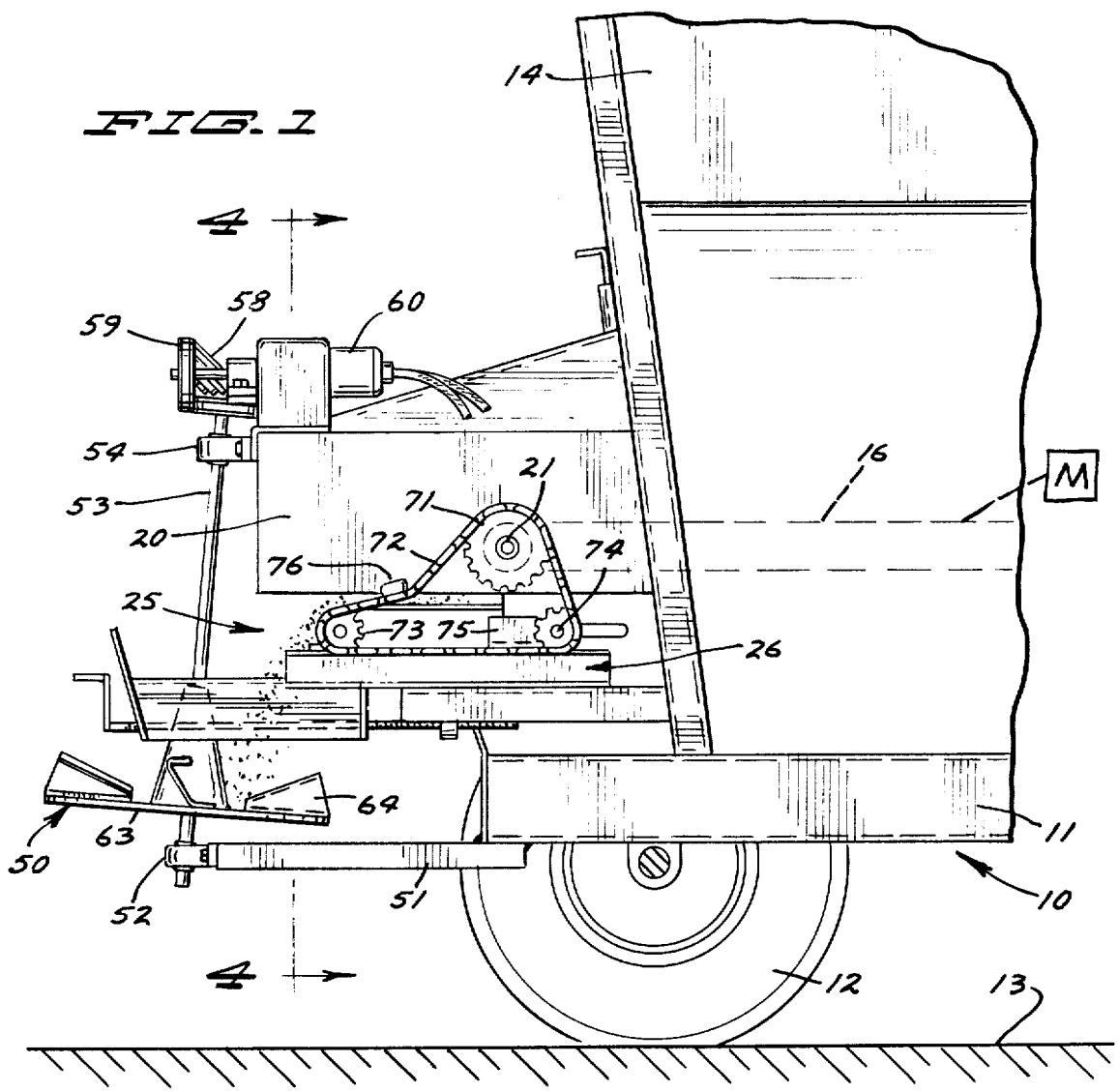
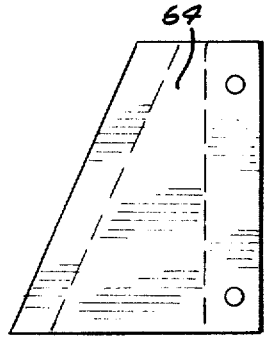
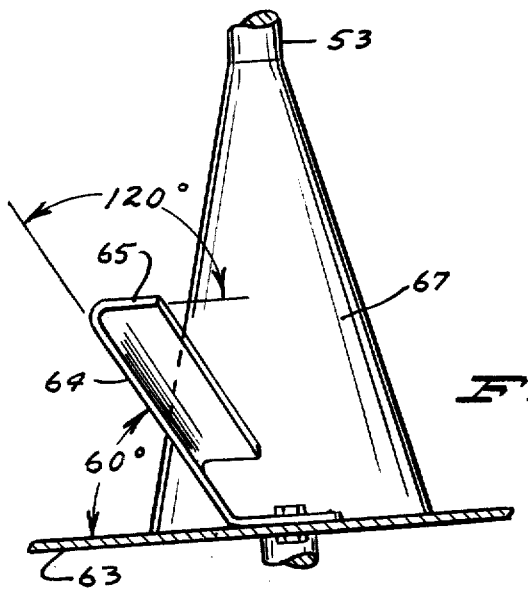

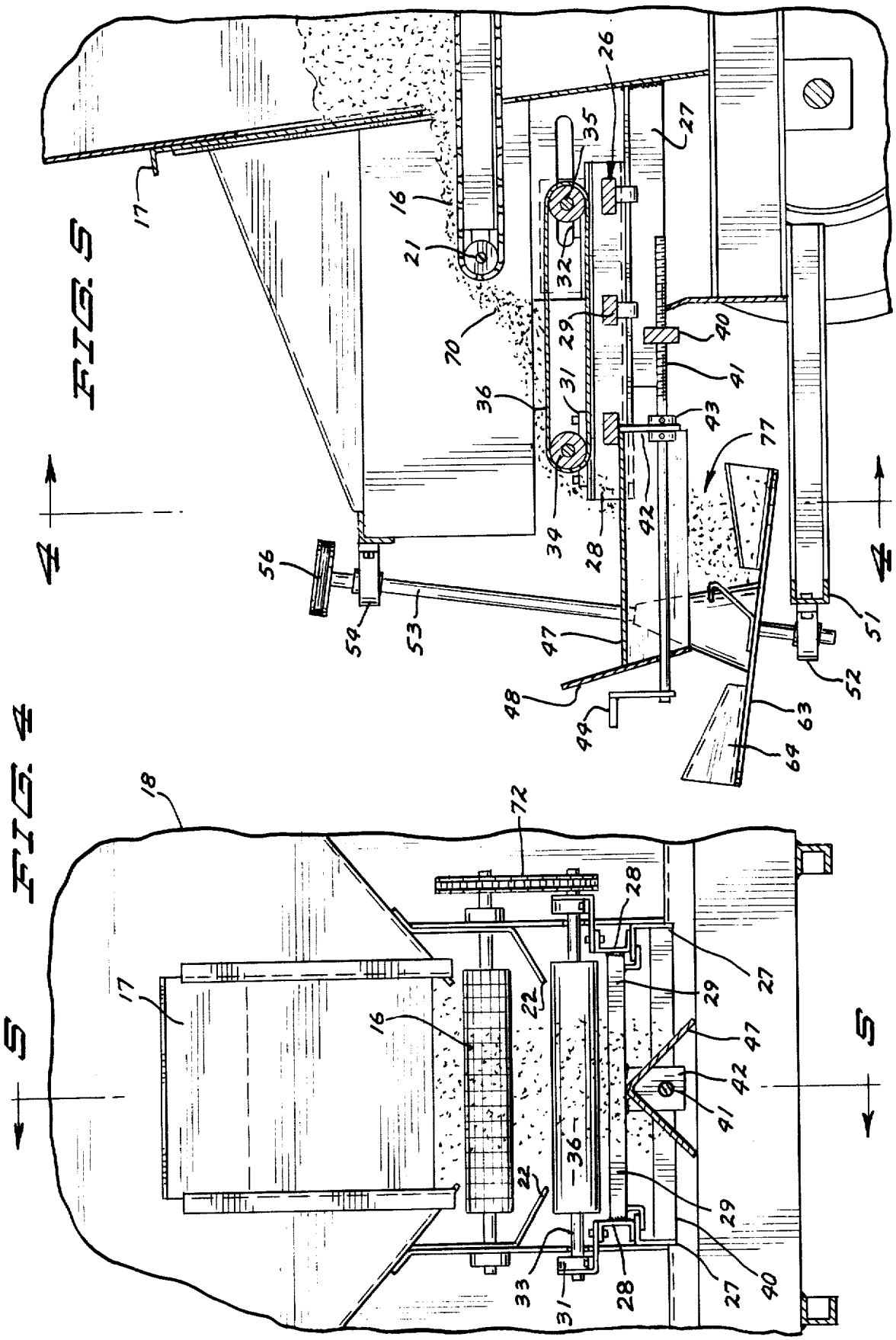

LIVE BOTTOM CHUTE FOR SPREADERS

BACKGROUND OF THE INVENTION

1. Field of the Invention

The present invention relates to spreaders for spreading material over field areas with means for depositing the material on the spinner in preselected locations.

2. Prior Art

In the prior art fertilizer spreaders are quite well known. Such a fertilizer spreader is shown in U.S. Pat. No. 3,085,807 whereby inorganic particulate material is carried in a trailer body, and a conveyor belt is used for moving the material from the body toward spinner members that are positioned to the rear of the trailer and serve to spread the material out over the field as the trailer is moved along the field.

In this patent, which is typical of many different types of spreaders, it is necessary to utilize baffles and guides for the material to deposit the material to be spread near the proper location on the spinners so that the spreading job is even and accurate.

Most inorganic fertilizer that is spread is in the form of small pellets with a relatively low angle of repose. The trailer or truck box that is used can also be used for spreading lime which has a high angle of repose. When the different types of material with different angle of repose are used interchangeable, the positioning of the guide baffles used to direct material to the spinners becomes quite complex in order to obtain any type of a satisfactory spread pattern. Usually the baffles are difficult to make, difficult to adjust, and never seem to be satisfactorily positioned to achieve a good spread pattern.

SUMMARY OF THE INVENTION

The present invention relates to improvements in the feeding mechanism for spreaders used for spreading granular or particulate material. The unit comprises a belt assembly that is positioned below the normal discharge point from the spreader box or compartment, and which conveys the material to a position where the material will be dropped from the end of the belt directly above rotors or spinners that are used for distributing the material. The belt assembly can be adjusted in fore and aft direction so that material that follows a different flow path on baffles because of different angles of repose can be deposited at a different part to insure that the material will stroke the proper location on the spinners and will be properly distributed.

The live bottom belt assembly feed chute is self-contained, and is synchronously driven from the main conveyor belt used with the compartment so that as the main conveyor belt is powered the live bottom belt assembly will also be powered. Simple deflectors or flow dividers can be used for dividing the flow of material from the end of the belt assembly onto two spinners that are normally operated. The fore and aft positioning of the point of deposit of the material is adjusted by moving the live bottom belt assembly itself.

The live bottom chute may be mounted onto truck or trailer mounted spreaders, or onto other powered spreaders as desired. The belt assembly makes the spreaders usable for different types of material, for example pelletized inorganic fertilizer or lime, with the uniform spreading of both types of material and with elimination of complex baffles and chutes. The unit is easily adjustable with a hand crank. dr

BRIEF DESCRIPTION OF THE DRAWINGS

FIG. 1 is a side elevational view of a rear portion of a fertilizer spreader trailer having a live bottom feed belt assembly made according to the present invention installed thereon;

FIG. 4 is a sectional view taken as on line 4—4 in FIG. 5;

FIG. 5 is a sectional view taken as on line 5—5 in FIG. 4;

FIG. 6 is a sectional view taken as on line 6—6 of FIG. 3 showing a blade used for the distributor spinners of the present invention; and FIG. 7 is a flat layout of the blade of FIG. 6.

DESCRIPTION OF THE PREFERRED EMBODIMENT

Figure 2:
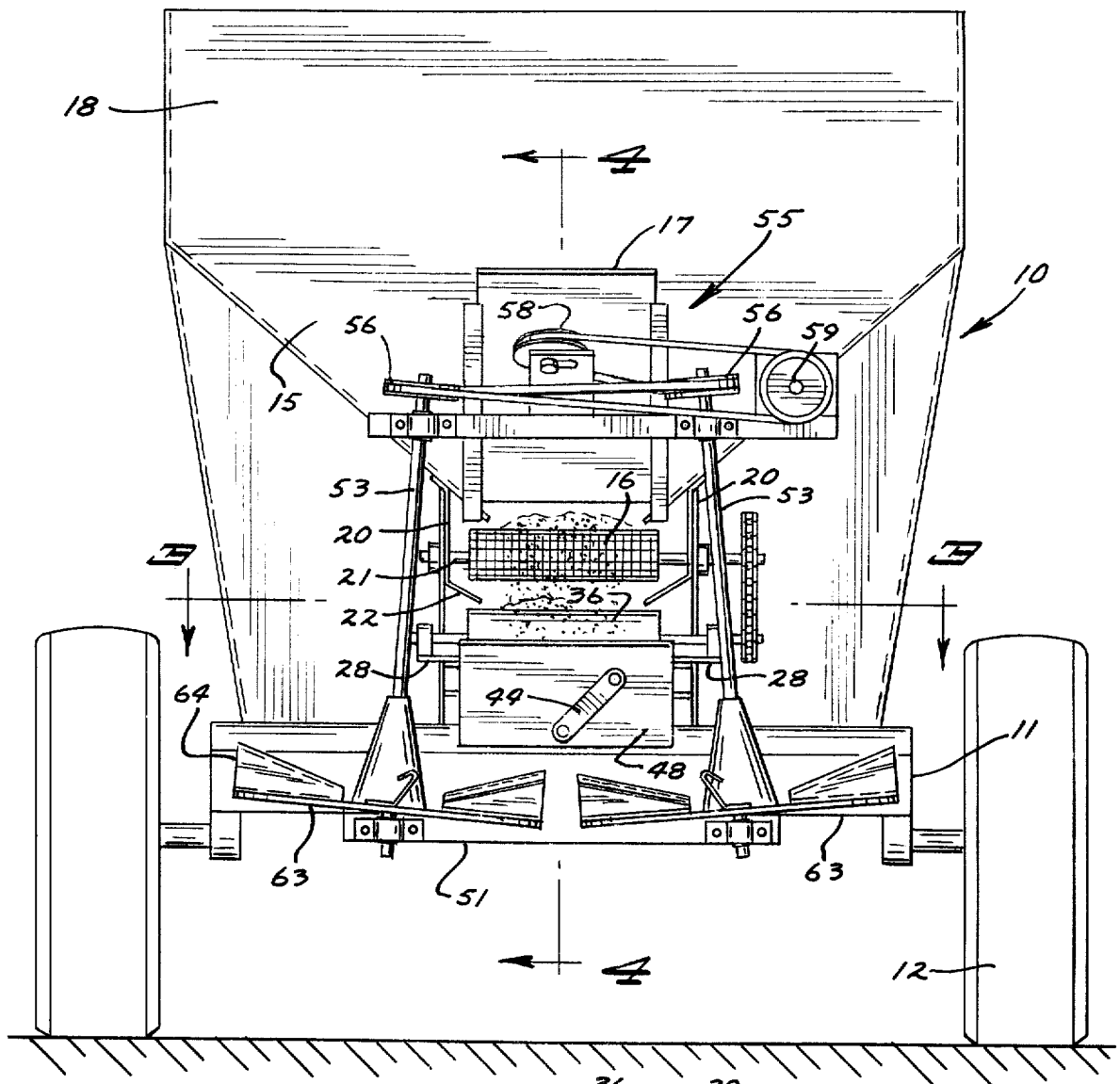
FIG. 2 is a rear elevation view of the unit of FIG. 1.
Figure 3:
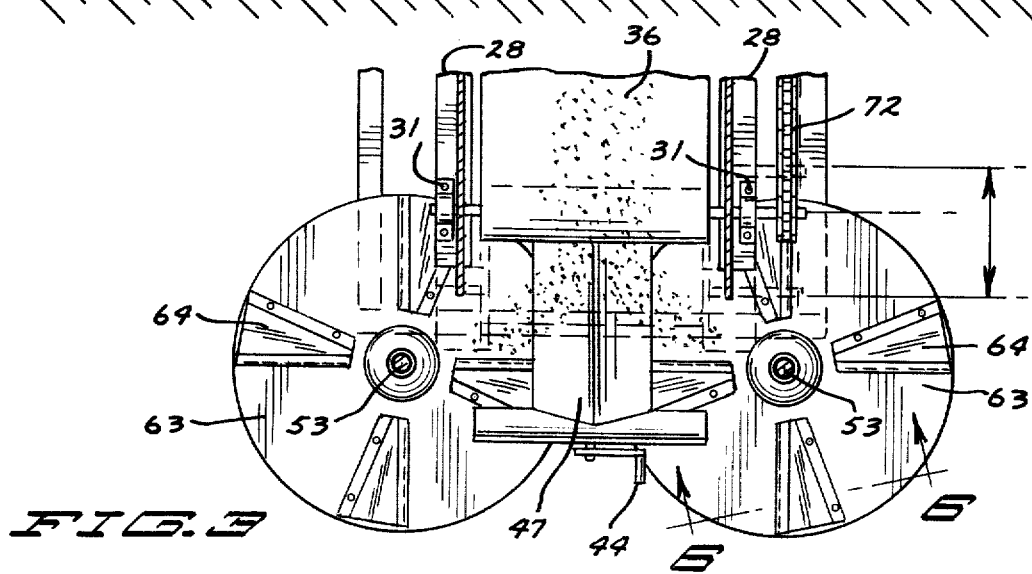
FIG. 3 is a sectional view taken as on line 3—3 in FIG. 2.

Referring to FIG. 1, a fertilizer spreader trailer illustrated generally at 10 has a frame 11, mounted on suitable wheels 12 that support the unit for movement along the ground 13. The material box or compartment illustrated generally at 14 is used for storing and carrying the material to be distributed or spread. The storage box construction can be any desired construction but generally the side walls include downwardly and inwardly tapering walls shown at 15, that lead to a lower fore and aft extending main conveyor belt 16. This main belt 16 is normally an open mesh belt that is powered from a suitable source of power such as a ground drive wheel, a hydraulic motor or the like, and which will carry material rearwardly out of the box through a feed gate 17 regulating an opening in the rear wall 18 of the box.

The main conveyor belt 16 is supported at the rear of the box between upright side plates 20,20 in suitable bearings, and is mounted over a rear roller that in turn is mounted onto a shaft 21 that extends through the side plates 20. The side plates 20 also have inwardly bent guides 22 that extend rearwardly of the end of belt 16 and guide particulate materials deposited by the rear of the main conveyor belt 16 into a narrower and controlled width band. Directly below the conveyor belt 16, and with at least a portion thereof extending rearwardly from the rear end of the conveyor belt 16, is a live bottom chute conveyor belt assembly illustrated generally at 25. This belt assembly 25 comprises suitable framework 26 that is mounted with respect to the side plates 20 below the main conveyor belt 16. The live belt assembly frame 26 is slidably mounted with respect to suitable support members 27 that are mounted on the side plates 20, and the frame 26 has cross supports as necessary to keep the side members 28 of this frame secure. The side members 28 of the frame 26 are connected together with cross members 29, and include supports on which suitable bearings 31 are mounted at the rear of the frame. A pair of bearings 32 are mounted at the front of the supports 28 as well. A cross shaft 33 is mounted on bearings 31, and the shaft 33 has a belt support roller 34 mounted thereon. The forward roller and shaft 35 (see FIG. 5) are mounted in the bearings 32, and an endless conveyor belt 36 is mounted over these rollers and moves in an endless path below the belt 16. The belt can be a normal rubber and fabric belt. The conveyor belt rollers 34 and 35 move as a unit with the side frame members 28. The frame can be slid along the supports 27 in fore and aft direction.

In order to control the fore and aft movement of the live conveyor belt assembly frame, a stationary support 40 is attached between the side members 27, and a screw crank 41 has its outer end threadably mounted through support 40. The screw also rotatably passes through a plate 42 that depends from one of the cross members 29 on the frame 26, and a pair of thrust collars 43 are mounted on opposite sides of this plate and attached to the screw 41 so that the thrust collars rotate with respect to the plate 42. When the screw is rotated, the collars do not move axially along the screw. The crank handle 44 at the end of the screw extends rearwardly of the unit. Turning the crank will move the plate 42 in fore and aft direction, and therefore move the frame 26 and the belt 36 in fore and aft direction.

It can also be seen that the cross member 29 at the rear of the frame 26 carries an inverted V shaped deflector 47 that has a rear deflector 48 attached thereto, and the crank handle 44 is to the outside of the rear deflector 48. The V shaped deflector 47 divides the material dropping off the rear of the belt 36. The center line of the deflector is approximately on the longitudinal central axis of the belt 36.

At the rear of the fertilizer spreader trailer a pair of spreader rotors or spinners indicated generally at 50 are mounted. Spinners are widely used, except as shown, a unique blade for the spinners is used. The spinners have shafts 53 with the lower ends mounted on a frame portion 51 with suitable bearings 52, the shafts 53 extend upwardly, and are mounted in bearings 54 attached to a cross frame member which is also mounted on the plate portions 20. Suitable reinforcing supports can be used as desired. A V belt drive illustrated generally at 55 is used with a V belt pulley 56 at the top of each of the shafts 53 and a suitable idler or guide pulley 58 is used to guide the V belts in a known manner so that the belt stays on the pulleys for the spinners. A drive pulley 59 mounted on the output shaft of a hydraulic motor 60 is used on the V belt drive 55. The hydraulic motor can be driven from a suitable power source such as a towing vehicle power source through suitable valves. The spinner assemblies 50 include spinner discs 63 drivably mounted in each of the shafts and the spinner discs are provided with upright blades 64 that as shown incline 60° from the plane of the spinner discs (see FIG. 6). The upper edges of the blades rotationally trail the lower edges.

Also, the spinner discs taper toward a lesser height in direction toward the inner end thereof (near the axis of rotation) as shown in FIG. 5, so that the upper flange 65 is inclined upwardly in direction radially outwardly from the axis of rotation toward the periphery of the spinner. A cone shaped shield 67 can be utilized on each of the shafts 53 to guide material falling near the center of the shafts outwardly to position spaced away from the shaft onto the discs 63. The blades insure a good spread pattern in cooperation with the easy adjustable feed chute so the point where material strikes the spinners and blades can be accurately controlled.

The speed of rotation of the spinners is controlled by the motor 60 and the size of the V belt pulleys being used. The speed can be changed to achieve proper spreading speed.

The conveyor belt 36 thus carries particulate material indicated at 70 coming off the rear of the main conveyor chain belt 16 from the inside of the box 11. The conveyor belt 36 is driven by a sprocket 71 on the shaft for the rear roller of conveyor 16, and a chain 72 driving a sprocket 73 on the roller 34. An idler sprocket 74 that is mounted onto a bracket 75 mounted on and movable with the frame 26 is also provided. A spring loaded tightener indicated at 76 can be used for chain take-up as the entire lower frame 26 is moved in fore and aft direction by the crank. It can be seen that the sprocket sizes for sprockets 71 and 73 will cause the shaft and roller 34 to rotate approximately twice as fast as the shaft 21 for the conveyor 16. This sprocket arrangement causes the belt 36 lineal speed to be approximately twice as fast as the chain conveyor 16 lineal speed.

When particulate material is being discharged, the position of the conveyor belt 36 is adjusted so that the material coming off the discharge end of conveyor belt 36 as indicated at 77 will strike the discs 63 in the desired position. It can be seen that the divider 47 will divide the material coming off the belt 36 so that half of it will go onto each of the spreader discs. The material will drop onto the spreader discs near the center of rotation thereof and toward the inner end of the blades 64. When particulate material of a different angle of repose is used, the entire conveyor belt frame 26 and belt 36 can be moved in fore and aft direction as desired by operating the crank 44 so that the material being discharged will strike the spinners in approximately the same position, or at least in a desired position which will give proper spread distribution. It can be seen that this live bottom chute comprising the belt assembly eliminates the need for complex baffles that have to be adjusted and angled differently for different types of material, and makes the spreader itself usable with pelletized inorganic material as well as the ordinary lime. A further feature is that the higher lineal speed of the conveyor belt 36 tends to level out or thin out the material and break up any clumps that might be coming off the conveyor belt 16, for example when lime is being spread. The particulate material is accelerated as it strikes the conveyor belt 36 and there is a tendency of the material to level off, eliminate clumps, and keep a uniform feed back to the spinners or spreader members. Thus the higher speed of the rear conveyor belt is desirable.

The amount of material fed is regulated by the gate 17 iin an ordinary manner, so that the total amount of material being carried by the belt 36 will be controlled by the feed gate. The point of depositing this material through can be readily changed by moving the live bottom chute belt assembly.

What is claimed is:

1. In a spreader for particulate material having a storage compartment, and means for discharging material from said storage compartment, a spreader mechanism for receiving and spreading said particulate material the spreading pattern of which is dependent on the location where material to be spread is deposited thereon, said means for discharging depositing said material in a location above said spreading mechanism, the improvement comprising a movable conveyor belt assembly positioned below said means for discharging material in position to receive material therefrom and to convey said material to said spreader mechanism, said conveyor belt having a discharge end for depositing material on said spreader mechanism, and means movably mounting said conveyor belt assembly on said spreader whereby the discharge end of said conveyor belt can be adjusted with respect to said spreader mechanism to change the location where material carried by the conveyor belt assembly is deposited on said spreader mechanism.

2. The combination as specified in claim 1 wherein said spreader mechanism comprises a spinning member rotating about an axis, and said means to movably mount said conveyor belt permits movement of the discharge end of said conveyor belt in a direction to change the location where material carried by said conveyor belt strikes the location where material carried by said conveyor belt strikes the spinning member with respect to the axis of said spinning member.

3. The combination as specified in claim 1 wherein said means for discharging material from said storage compartment comprises means imparting a first laterial component of movement to said material in direction toward said spreader mechanism, and wherein said conveyor belt imparts a second greater lateral component of movement to said material toward said spreader mechanism.

4. The combination as specified in claim 2 wherein said means for discharging material from said compartment comprises a main discharge belt member, and inwardly directing guide means along the lateral sides of said main discharge belt member to guide material dropped from said main discharge belt member into a path predetermined width onto the top of said conveyor belt.

5. The combination of claim 4 wherein said main discharge belt member travels at a first lineal speed, and said conveyor belt travels at a second greater lineal speed than said first lineal speed.

6. The combination as specified in claim 1 wherein said means movably mounting said conveyor belt comprises a frame member slidably mounted with respect to said compartment, a crank member, and means mounting said crank member with respect to said frame and said compartment whereby threadable movement of said crank will move said frame with respect to said compartment.

7. The combination as specified in claim 2 wherein said spreader mechanism comprises two of said spinning members mounted in side by side relationship, and an inverted V shaped divider dividing material from said conveyor belt to direct said material to both of said spinning members.

8. The combination as specified in claim 2 wherein said spinning member comprises a support rotatably mounted about a generally upright axis, a plurality of blade members on said support and extending upwardly from said support, said blade members comprising a first planar member inclined from a plane normal to the plane of rotation of said support and inclined in a direction wherein the upper edges of said planar member rotationally trail the lower portions thereof adjacent said support, and a flange on said planar member, said flange extending from a first height above said support at portions of said blade members adjacent the axis of rotation of said support to a second greater height adjacent the periphery of said support.

9. In a mobile spreader for particulate material having a storage compartment, frame means to support said compartment for movement along the ground, means for discharging material from said storage compartment, and a spreader mechanism for receiving and spreading said particulate material as the compartment is moved comprising at least one spinner member rotatable about an aixs, said means for discharging being positioned above said spreader mechanism and spaced from said axis, the improvement comprising a conveyor belt assembly including a separate frame and having a powered endless conveyor belt with an upper portion positioned below said means for discharging material in position to receive material therefrom and being operable to convey said material toward said axis, said conveyor belt having a discharge end, and means mounting said separate frame of said conveyor belt assembly on said spreader for selective sliding movement whereby the discharge end of said conveyor belt can be moved laterally with respect to said axis to change the path of free fall of material discharged from said discharge end in relation to said spinner member.

10. The spreader of claim 9 wherein said means for discharging comprising an opening in a wall of said compartment, and a main conveyor belt mounted in the bottom of said compartment and operable to move particulate material through said oepning, said main conveyor belt being movable, and drive means synchronized with said main powered endless conveyor belt to drive said conveyor belt at a desired speed greater than said main conveyor belt.

11. The combination as specified in claim 10 and guide means positioned along the lateral sides of said main conveyor belt and including portions extending in position to guide material dropped from said main conveyor belt into a path of predetermined width onto the top of said powered endless conveyor belt.

12. In a spreader for particulate material having a storage compartment, means for delivering the particulate material from said storage compartment, and spinner means positioned to receive material from said storage compartment and for spreading the material, said spinner means including a first member rotating in a plane about a generally upright axis, and blade means mounted on said first member, said blade means including a planar member extending upwardly from said first member and having upper portions of said planar member rotationally trailing the lower portions of said blade member adjacent said first member, and an upper flange on said blade member, said flange rotationally leading said blade member, and extending from an inner end near said generally upright axis outwardly away from said axis and upwardly in direction away from said first member.

13. The spreader of claim 12 wherein said means for delivering the particulate material includes a short conveyor belt assembly mounted on said spreader, and means to move said conveyor belt assembly in a lateral direction with respect to said upright axis.

14. The spreader of claim 13 wherein said first member comprises a spinner disc rotating in a plane, and a plurality of said blade members being fixed to said disc at spaced locations thereon.

* * * * *

UNITED STATES PATENT OFFICE
CERTIFICATE OF CORRECTION

PATENT NO. : 3,889,883
DATED : June 17, 1975
INVENTOR(S) : Robert D. Anderson

It is certified that error appears in the above-identified patent and that said Letters Patent are hereby corrected as shown below:

Column 1, line 26 "material" should be --materials--; Column 1, line 27 "interchangeable" should be --interchangeably--; Column 1, line 67 after "crank." remove --dr--. Column 4, line 50 after 17 "iin" should be --in--. Column 5, line 15, (Claim 2, line 7), take out (second occurrence) "location where material carried by said conveyor belt strikes the". Column 6, line 29, (Claim 10, line 7), after "main" take out "powered endless"; Column 6, line 30 before "conveyor" insert --powered endless--.

Signed and Sealed this thirtieth Day of September 1975

[SEAL]

Attest:

RUTH C. MASON
Attesting Officer

C. MARSHALL DANN
Commissioner of Patents and Trademarks